Patented Apr. 6, 1943

2,315,661

UNITED STATES PATENT OFFICE 2,315,661

MANUFACTURE OF NITRILE COMPOUNDS

Walter Salzer and Hans Andersag, Wuppertal-Elberfeld, Germany, assignors to Winthrop Chemical Company, Inc., New York, N. Y., a corporation of New York No Drawing. Application June 11, 1940, Serial No. 339,892. In Germany May 27, 1939

6 Claims. (Cl. 260—319)

This invention relates to a process of manufacturing nitrile compounds and the carboxylic acids formed by saponification of the nitrile group of the said compounds.

In accordance with the present invention tertiary aminomethyl compounds, the tertiary aminomethyl group of which has been formed by the action of formaldehyde and a secondary amine upon a compound containing a reactive hydrogen atom while replacing the said hydrogen atom, can be converted into the corresponding cyanomethyl compounds by reacting upon the said tertiary aminomethyl compound with hydrocyanic acid or a salt of hydrocyanic acid in the presence of a diluent which is inert to the reacting components and at increased temperature. In this process the tertiary amino group attached to the methyl group is replaced by the cyano group, while splitting off in the form of a secondary amine. Suitable compounds containing a tertiary aminomethyl group which has been formed by the action of formaldehyde and a secondary amine while replacing a reactive hydrogen atom are for instance indol compounds, particularly those indol compounds which contain the tertiary aminomethyl group in the 3-position. Other suitable compounds of the kind specified are for instance aromatic hydroxyl compounds in which a reactive hydrogen atom has been replaced by a tertiary aminomethyl group by the action of formaldehyde and a secondary amine, for instance, dialkylaminomethyl phenols and dialkylaminomethyl naphthols. In the said compounds containing the tertiary aminomethyl substituent the tertiary nitrogen atom may contain the most varied substituents. Tertiary aminomethyl groups derived from the lower aliphatic dialkyl amines are preferred since such tertiary aminomethyl compounds are most readily available. But also tertiary aminomethyl compounds derived from other secondary amines, for instance from heterocyclic secondary amines, such as pyrrolidine and piperidine, may be used in the present process. The reaction is carried out in the presence of a solvent or diluent which is inert to the starting materials such as water, alcohols, preferably water-soluble alcohols such as methyl alcohol, ethyl alcohol, propyl alcohol which may be used in admixture with water, or also alcohols which are slightly soluble in water such as amyl alcohol, octyl alcohol etc. Other solvents which are particularly useful when using hydrocyanic acid as the reacting agent are for instance, benzene, toluene, tetrahydronaphthalene, xylene, decahydronaphthalene, ligroine, chloroform, carbontetrachloride, dioxane etc. As salts of hydrocyanic acids water-soluble salts are preferred, for instance, the ammonium salt and the alkali metal salts such as the sodium, potassium and lithium salt. The alkaline reacting salts are particularly useful in alcoholic-aqueous solution. The nitrile compounds primarily formed in such reaction mixture are simultaneously saponified to the corresponding carboxylic acids by the alkaline reaction of the mixture so that the tertiary aminomethyl compounds may be transformed in this manner in only one step into the corresponding methyl carboxylic acids.

The invention may be performed, for instance, while heating the mixture on the waterbath but higher temperatures such as from about 150–200° C. are advisable to accelerate the completion of the reaction. In such cases the reaction is advantageously carried out in a closed vessel which is capable of resistance to increased pressure.

The invention is furthermore illustrated by the following examples, without being restricted thereto:

Example 1

100 grams of 3-dimethylaminomethyl-indol are heated for some time with 300 ccm. of ethanol and a solution of 100 grams of sodium cyanide in 150 ccm. of water in an autoclave at a temperature of 200° C. in the heating bath. The solution thus obtained is mixed with 200 ccm. of water and the ethanol is blown off with steam. After filtration the aqueous solution is acidified with diluted sulfuric acid until it reacts acid to Congo red. Thereupon the indol-3-acetic acid formed precipitates in colorless crystals melting at 164–165° C. The yield corresponds almost to that calculated theoretically.

Example 2

5 grams of 3-dimethylaminomethyl-indol are heated with 10 grams of anhydrous hydrogen cyanide and 30 ccm. benzene for some time in an autoclave at a temperature of 150° C. in the heating bath. The solution is then mixed with aqueous sodium carbonate solution and the benzene layer is separated. After drying the latter with sodium sulfate the benzene is evaporated and the residue distilled. The indol-3-acetonitrile formed distils as an oil at 160° C. under 0.2 mm. pressure. By saponification with alkali, the nitrile may be converted in the known manner into the corresponding carboxylic acid.

Example 3

5 grams of 3-piperidinomethyl-indol are treated with 10 grams of anhydrous hydrogen cyanide and 30 ccm. of benzene according to the directions of Example 2. The indol-3-acetonitrile obtained distils as an oil at 160° C. under 0.2 mm. pressure.

Example 4

10 grams of 3-diethylaminomethyl-indol are treated with 30 ccm. of ethanol and a solution of 10 grams of sodium cyanide in 15 ccm. of water according to the directions of Example 1. The indol-3-acetic acid melting at 164–165° C. is obtained.

Example 5

10 grams of 2-phenyl-3-dimethylaminomethyl-indol (obtained from 2-phenyl-indol, dimethylamine and formaldehyde in glacial acetic acid) are treated with 30 ccm. of ethanol and a solution of 10 grams of sodium cyanide in 15 ccm. of water according to the directions of Example 1. The 2-phenyl-indol-3-acetic acid is obtained in crystals melting at 174° C.

Example 6

10 grams of 1-hydroxy-2-dimethylaminomethyl-4-methyl-benzene are heated for some time with 10 ccm. of ethanol, 5 grams of sodium cyanide and 10 ccm. of water in an autoclave at 150° C. The reaction mixture is then mixed with 30 ccm. of water and the ethanol evaporated under diminished pressure. The aqueous solution is once extracted with ether and then acidified by dilute sulfuric acid until the reaction is acid to Congo red. The 1-hydroxy-4-methyl-phenyl-2-acetic acid thus precipitated is dissolved in ether, the solution is dried and the ether evaporated. The said acid is then obtained as a colorless oil which is readily soluble in aqueous alkali metalbicarbonate solution. The 1-methoxy-4-methyl-phenyl-2-acetic acid-methyl ester obtained by methylation boils at 120–125° C. under 5 mm. pressure.

Example 7

10 grams of 1-hydroxy-2-dimethylaminomethyl-4-allyl-6-methoxy-benzene (obtained from eugenol, formaldehyde and dimethylamine) are heated for some time in an autoclave with 10 ccm. of ethanol, 5 grams of sodium cyanide and 10 ccm. of water to 150° C. The reaction mixture is treated as indicated in Example 6. The 1-hydroxy-4-allyl-6-methoxy-phenyl-2-acetic acid is thus obtained in crystals melting at 92° C.

When using 1-hydroxy-2-diethylaminomethyl-4-allyl-6-methoxy-benzene (obtained from eugenol form aldehyde and diethylamine) the same final product is obtained.

Example 8

10 grams of 1-dimethylaminomethyl-2-hydroxynaphthalene are treated as indicated in Example 6 with 10 ccm. of ethanol, 5 grams of sodium cyanide and 10 ccm. of water. The 2-naphthol-1-acetic acid is obtained in crystals melting at 147° C.

When starting with 2,6-dihydroxy-1,5-bis-(dimethylaminomethyl)-naphthalene, the 2,6-dihydroxy-naphthalene(1,5) di-acetic acid is obtained. When heated it decomposes at about 270° C. The corresponding dilactone decomposes at 205° C.

Example 9

10 grams of 1-hydroxy-2-dimethylaminomethyl-4-methyl-6-bromobenzene (obtained from 1-hydroxy-4-methyl-6-bromobenzene, formaldehyde and dimethylamine) are treated as indicated in Example 6 with 10 ccm. of ethanol, 5 grams of potassium cyanide and 10 ccm. of water. The 1-hydroxy-4-methyl-6-bromophenyl-2-acetic acid is thus obtained in crystals melting at 83° C.

Example 10

10 grams of 5-dimethylaminomethyl-6-hydroxyquinoline (melting at 100° C., obtained from 6-hydroxyquinoline, formaldehyde and dimethylamine) are treated with 10 ccm. of ethanol, 5 grams of sodium cyanide and 10 ccm. of water as indicated in Example 6. The 6-hydroxyquinoline-5-acetic acid is obtained in crystals melting at 222° C.

Example 11

5 grams of 1-dimethylaminomethyl-2-hydroxynaphthalene are heated for some time with 5 grams of anhydrous hydrocyanic acid and 30 ccm. of benzene in an autoclave at 150° C. The reaction mixture is mixed with methylenechloride, the filtered solution twice washed with dilute hydrochloric acid, then dried and the solvent evaporated. The solid residue contains the 1-cyano-methyl-2-hydroxynaphthalene which may be converted into the 2-naphthol-1-acetic acid forming crystals melting at 147° C. by heating the residue with a solution of 3 grams of potassium hydroxide in 10 ccm. of ethanol and 5 ccm. of water until the development of ammonia has ceased. After the addition of water and the evaporation of the ethanol under diminished pressure, the said 2-naphthol-1-acetic acid is obtained upon acidification of the solution.

We claim:

1. The process of preparing nitriles which comprises reacting a compound of the general formula $$X-CH_2-Y$$

wherein X stands for a radical selected from the group consisting of the β-indole radical and the radical of a hydroxy aromatic compound, the OH group of which is in the same ring as the —CH₂Y group, and Y stands for a secondary amino group with an alkali metal salt of hydrocyanic acid in the presence of a diluent which is inert to the reacting components and at increased temperature.

2. A process of preparing nitriles which comprises reacting upon an indol, substituted by a 3-tertiary amino methyl group with an alkali metal salt of hydrocyanic acid in the presence of a diluent which is inert to the reacting components at increased temperature.

3. The process of preparing nitriles which comprises reacting upon an indol substituted in the 3-position by a tertiary aminomethyl group with an alkali metal salt of hydrocyanic acid in the presence of a diluent which is inert to the reacting components and at increased temperature.

4. The process of preparing nitriles and carboxylic acids therefrom which comprises reacting upon an indol substituted in the 3-position by a tertiary aminomethyl group with an alkali metal salt of hydrocyanic acid in the presence of water and a water-soluble alcohol and at increased temperature.

5. The process of preparing nitriles which comprises reacting upon an aromatic hydroxyl compound the nucleus of which is substituted by a tertiary aminomethyl group, which has been formed by the action of formaldehyde and a secondary amine upon an aromatic hydroxyl compound containing a reactive hydrogen atom, with an alkali metal salt of hydrocyanic acid in the presence of a diluent which is inert to the reacting components and at increased temperature.

6. The process of preparing nitriles which comprises reacting upon a phenol the nucleus of which is substituted by a tertiary aminomethyl group, which has been formed by the action of formaldehyde and a secondary amine upon an aromatic hydroxyl compound containing a reactive hydrogen atom, with an alkali metal salt of hydrocyanic acid in the presence of a diluent which is inert to the reacting components and at increased temperature.

WALTER SALZER.
HANS ANDERSAG.